United States Patent
Park et al.

(10) Patent No.: US 9,635,170 B2
(45) Date of Patent: Apr. 25, 2017

(54) APPARATUS AND METHOD FOR CONTROLLING TERMINAL TO EXPAND AVAILABLE DISPLAY REGION TO A VIRTUAL DISPLAY SPACE

(75) Inventors: Joon Ah Park, Yongin-si (KR); Abhay Sukumaran, Stanford, CA (US); Katherine Murray, Stanford, CA (US); Won-Chul Bang, Yongin-si (KR); Clifford Nass, Stanford, CA (US); Sung Ho Park, San Jose, CA (US)

(73) Assignees: Samsung Electronics Co., Ltd., Gyeonggi-do (KR); Board of Trustees of the Leland Stanford Junior University, Palo Alto, CA (US)

( * ) Notice: Subject to any disclaimer, the term of this patent is extended or adjusted under 35 U.S.C. 154(b) by 565 days.

(21) Appl. No.: 13/260,474

(22) PCT Filed: Mar. 26, 2010

(86) PCT No.: PCT/KR2010/001848
§ 371 (c)(1),
(2), (4) Date: Jan. 17, 2012

(87) PCT Pub. No.: WO2010/110614
PCT Pub. Date: Sep. 30, 2010

(65) Prior Publication Data
US 2012/0113030 A1   May 10, 2012

(30) Foreign Application Priority Data

Mar. 26, 2009 (KR) .................. 10-2009-0025760

(51) Int. Cl.
*H04M 1/725* (2006.01)
*G06F 3/0488* (2013.01)

(52) U.S. Cl.
CPC .... *H04M 1/72583* (2013.01); *G06F 3/04883* (2013.01); *G06F 3/04886* (2013.01); *H04M 2250/22* (2013.01)

(58) Field of Classification Search
USPC ............... 345/173–178; 178/18.01–20.04
See application file for complete search history.

(56) References Cited

U.S. PATENT DOCUMENTS

2005/0270278 A1* 12/2005 Ouchi ......................... 345/173
2006/0238517 A1* 10/2006 King et al. ................. 345/173
(Continued)

FOREIGN PATENT DOCUMENTS

| KR | 10-2007-0019849 | 2/2007 |
| KR | 10-2008-0041809 | 5/2008 |
| KR | 10-2008-0097789 | 11/2008 |

OTHER PUBLICATIONS

International Search Report, mailed Oct. 19, 2010, in International Application No. PCT/KR2010/001848.

*Primary Examiner* — Ryan A Lubit
(74) *Attorney, Agent, or Firm* — Harness, Dickey & Pierce, P.L.C.

(57) ABSTRACT

An apparatus and method for controlling a terminal is provided. A terminal control apparatus may set a virtual display space in an outer circumferential portion of the terminal and map at least one file to the virtual display space. Through this, a display region of the terminal may be expanded to an outer circumferential region of the terminal.

12 Claims, 3 Drawing Sheets

(56) References Cited

U.S. PATENT DOCUMENTS

| | | | |
|---|---|---|---|
| 2008/0001924 A1* | 1/2008 | de los Reyes | G06F 3/04886 345/173 |
| 2008/0163119 A1* | 7/2008 | Kim | G06F 3/04886 715/840 |
| 2008/0168474 A1* | 7/2008 | Jeon | G06F 9/4843 719/320 |
| 2008/0207188 A1* | 8/2008 | Ahn | G06F 3/04847 455/418 |
| 2009/0135152 A1* | 5/2009 | Lii | G06F 3/0481 345/173 |
| 2009/0199128 A1* | 8/2009 | Matthews | G06F 3/0481 715/799 |
| 2009/0307631 A1* | 12/2009 | Kim et al. | 345/173 |

* cited by examiner

APPARATUS AND METHOD FOR CONTROLLING TERMINAL TO EXPAND AVAILABLE DISPLAY REGION TO A VIRTUAL DISPLAY SPACE

CROSS-REFERENCE TO RELATED APPLICATION

This application claims the priority benefit under 35 U.S.C. §119(a) of a Korean Patent Application No. 10-2009-0025760, filed Mar. 26, 2009, in the Korean Intellectual Property Office, the entire disclosure of which is incorporated herein by reference for all purposes.

BACKGROUND

1. Field

Exemplary embodiments relate to an apparatus and method for controlling a terminal, and more particularly, to an apparatus and method for controlling a terminal that may expand an available display region to a virtual display space corresponding to an outer circumferential portion of a display.

2. Description of the Related Art

As functions of an electronic device are currently diversified, a user may perform various operations using the diversified functions. Accordingly, there is increased attention on the efficient usage of a display space provided in the electronic device.

However, when the user desires to simultaneously perform the various operations in the display space, the display space is limited and thus there may be some constraints on use of the electronic device. In particular, in the case of a mobile terminal with the small display size such as Ultra Mobile Personal Computers (UMPC), the user may inadvertently select and execute a plurality of functions stored in the electronic device, causing various problems.

As technology enabling the use of the Internet via the mobile terminal is introduced, there is also an increasing need for the users to view more information in the small display space.

In the case of an electronic device with a touch screen, a conventional touch interface may perform a touch click operation or a drag operation for a menu or a file on a screen. When many menus or files are on the screen, it may be relatively easy to inadvertently execute a plurality of the menus or file functions at one time.

SUMMARY

According to exemplary embodiments, there may be provided an apparatus for controlling a terminal, the apparatus including: a space setting unit to set a virtual display space corresponding to an outer circumferential portion of a touch display provided in the terminal and to set a boundary space in the touch display to be adjacent to the virtual display space; a mapping unit to map at least one file among a plurality of files to the virtual display space; and a control unit to control a file processing operation of the terminal for the at least one mapped file when a touch signal input via the touch display is detected in the boundary space.

When the touch signal is consecutively detected in the boundary space, the control unit may control the file processing operation of the terminal.

According to exemplary embodiments, there may be provided an apparatus for controlling a terminal, the apparatus including: a space setting unit to set a virtual display space corresponding to an outer circumferential portion of a touch display provided in the terminal and to set a boundary space in the touch display to be adjacent to the virtual display space; and a mapping unit to map at least one file among a plurality of files to the virtual display space when a first touch signal input via the touch display is detected in a direction from the touch display to the virtual display space in the boundary space.

According to exemplary embodiments, there may be provided a method of controlling a terminal, the method including: setting a virtual display space corresponding to an outer circumferential portion of the touch display; setting a boundary space in the touch display to be adjacent to the virtual display space; mapping at least one file among a plurality of files to the virtual display space; and controlling a file processing operation of the terminal for the at least one mapped file when a touch signal input via the touch display is detected in the boundary space.

According to exemplary embodiments, there may be provided a method of controlling a terminal, the method including: setting a virtual display space corresponding to an outer circumferential portion of the touch display; setting a boundary space in the touch display to be adjacent to the virtual display space; and mapping at least one file among a plurality of files to the virtual display space when a first touch signal input via the touch display is detected in a direction from the touch display to the virtual display space in the boundary space.

According to another aspect of exemplary embodiments, there is provided at least one computer readable recording medium storing computer readable instructions to implement methods of exemplary embodiments.

BRIEF DESCRIPTION OF THE DRAWINGS

These and/or other aspects of exemplary embodiments will become apparent and more readily appreciated from the following description, taken in conjunction with the accompanying drawings of which.

DETAILED DESCRIPTION

Reference will now be made in detail to exemplary embodiments, examples of which are illustrated in the accompanying drawings, wherein like reference numerals refer to the like elements throughout. Exemplary embodiments are described below to explain the present disclosure by referring to the figures.

Figure 1:
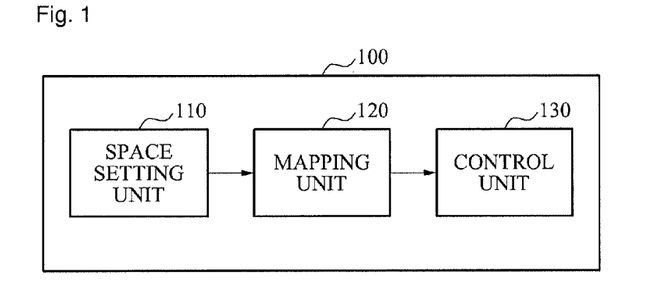
FIG. 1 is a block diagram illustrating a configuration of an apparatus for controlling a terminal according to exemplary embodiments.

FIG. 1 is a block diagram illustrating a configuration of an apparatus 100 for controlling a terminal according to exemplary embodiments.

The terminal control apparatus 100 may include a space setting unit 110, a mapping unit 120, and a control unit 130. Hereinafter, functions of the constituent components will be described.

The space setting unit 110 may set a virtual display space corresponding to an outer circumferential portion of a touch display included in the terminal and may also set a boundary space in the touch display to be adjacent to the virtual display space.

Specifically, the virtual display space denotes an imaginary space that is set in an outer surrounding region of the touch display.

According to exemplary embodiments, the terminal control apparatus 100 may set the virtual display space in the outer circumferential portion of the touch display and use the set virtual display space as though it is the display space. Through this, the terminal control apparatus 100 may expand a display region of the terminal to the outer circumferential portion of the terminal.

The boundary space denotes a space that is set in the touch display and is set in a boundary region between the touch display and the virtual display space. The boundary space is visually unseen.

The boundary space may be set in order to detect whether a user performs a touch act on the virtual display space. Here, the touch act may be a touch flick where a touch drag function and a touch click function are simultaneously performed.

According to exemplary embodiments, the virtual display space may be set on at least one of an upper side surface, a lower side surface, a left side surface, and a right side surface of the touch display. In this case, a single virtual display space or a plurality of virtual display spaces may be set in each side surface. Setting of virtual display space will be further described in detail with reference to FIG. 2.

The mapping unit 120 may map at least one file among a plurality of files to the virtual display space.

The file denotes any type of file that may be stored in the terminal, such as a document file, a picture file, an audio file, a video file, an Internet shortcut file connecting an Internet site, an icon file, and the like.

Specifically, the mapping unit 120 may link the at least one file among the plurality of files stored in the terminal, to the virtual display space. When the at least one file is mapped to the virtual display space, it may be understood that the at least one file mapped to the virtual display space exists and is displayed.

As described above, at least one virtual display space may be set. Therefore, the mapping unit 120 may map a single file to each of the at least one virtual display space. Also, the mapping unit 120 may map a single file to a portion of virtual display spaces and may map a plurality of files to another portion of virtual display spaces. The mapping unit 120 may map the plurality of files to all the virtual display spaces.

In order to indicate which file is mapped to which virtual display space, a particular cue may be displayed on the touch display to be adjacent to the virtual display space.

According to exemplary embodiments, the mapping unit 120 may map the at least one file to the virtual display space based on at least one of a number of times that each of the files is executed and a point in time when each of the files was most recently executed.

Specifically, the mapping unit 120 may map at least one file to the virtual display space in a frequently executed order among the plurality of files stored in the terminal. Also, the mapping unit 120 may map at least one file to the virtual display space in a most-recently executed order among the plurality of files. Also, by assigning a weight to the number of executions and the final execution point in time, the mapping unit 120 may map the at least one file to the virtual display space based on both the number of executions and the most recent execution point in time.

According to exemplary embodiments, the mapping unit 120 may map at least one file, selected from a user, to the virtual display space.

When a touch signal input via the touch display is detected in the boundary space, the control unit 130 may control a file processing operation of the terminal for the at least one mapped file.

Examples of the file processing operation may include file execute, file move, display of file information, and the like.

Specifically, the control unit 130 may determine whether the touch signal input from the user is detected in the boundary space. When the touch signal is detected in the boundary space, the control unit 130 may process at least one file that is mapped to the virtual display space that is adjacent to the detected boundary space according to a predetermined function.

Conversely, when the touch signal is not detected in the boundary space, the control unit 130 may perform a function corresponding to the touch signal, regardless of the virtual display space. For example, when the touch signal is detected not in the boundary space but in a location of a touch display region where a particular file is displayed, the control unit 130 may control the terminal to select or execute the particular file.

According to exemplary embodiments, when the touch signal is consecutively detected in the boundary space, the control unit 130 may control the file processing operation of the terminal.

Specifically, although the touch signal is detected in the boundary space, when the touch signal consecutively moves in the touch display space and is not detected and is, however, detected only in a particular location of the boundary space, the control unit 130 may control the terminal to recognize the detected touch signal as a touch signal for processing at least one file mapped to the virtual display space and to treat the detected touch signal in the same manner as a touch signal that is detected in the touch display region excluding the boundary space.

Accordingly, when the touch signal is detected only in the particular location of the boundary space, the control unit 130 may control the terminal to perform a function corresponding to the touch signal, regardless of the virtual display space. When the touch signal consecutively moves in the boundary space and is detected, the control unit 130 may process at least one file mapped to the virtual display space adjacent to the boundary space where the touch signal is detected, according to a predetermined function.

According to exemplary embodiments, when the touch signal is detected in a direction from the touch display to the virtual display space in the boundary space, the control unit 130 may execute the at least one file to control the file processing operation of the terminal.

Also, according to exemplary embodiments, when the touch signal is detected in the direction from the touch display to the virtual display space in the boundary space, the control unit 130 may display file information associated with the at least one file on the touch display to control the file processing operation of the terminal.

Also, according to exemplary embodiments, when the touch signal is detected in a direction from the virtual display space to the touch display in the boundary space, the control unit 130 may display the at least one file on the touch display to control the file processing operation of the terminal.

Hereinafter, the structure of a virtual display space set in a terminal according to exemplary embodiments will be described with reference to FIG. 2.

Figure 2:
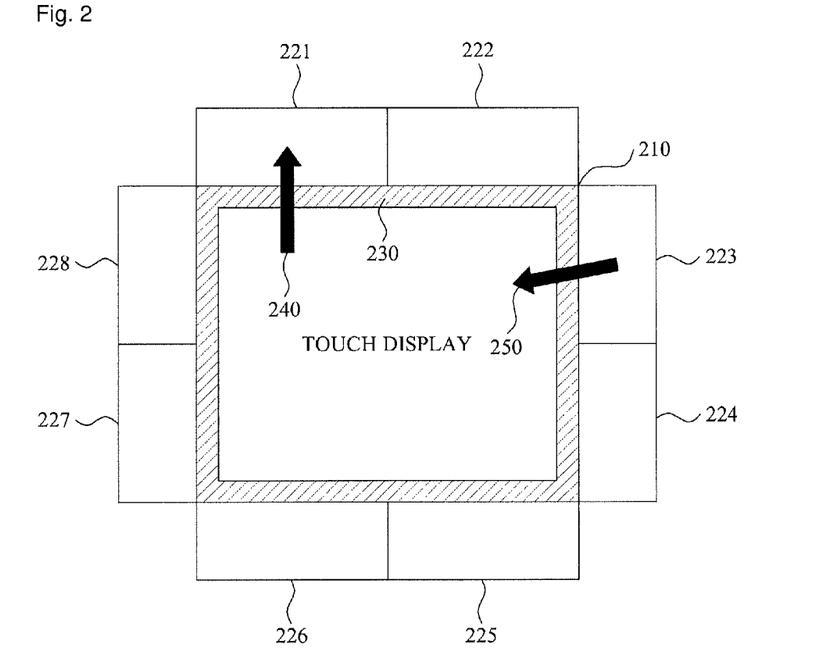
FIG. 2 illustrates the structure of a virtual display space set in a terminal according to exemplary embodiments.

FIG. 2 illustrates the structure of a virtual display space set in a terminal according to exemplary embodiments.

Referring to FIG. 2, two virtual display spaces 221 and 222, 223 and 224, 225 and 226, and 227 and 228 are provided in an upper side surface, a right side surface, a lower side surface, and a left side surface of a touch display 210, respectively. Here, it is assumed that a boundary 230 is set on the touch display 210 to be adjacent to the virtual display spaces 221 through 228.

An arrow indicator 240 denotes a movement of a touch signal that is detected when a user moves a touch input device, for example, a hand, a pen, and the like from the touch display 210 to the virtual display space 221. Another arrow indicator 250 denotes a movement of a touch signal that is detected when the user moves the touch input device from the virtual display space 223 to the touch display 210.

When the user moves the touch input device in a manner similar to the arrow indicator 240, the touch signal may be detected in a direction from the touch display 210 to the virtual display space 221 in the boundary space 230.

In this case, the control unit 130 may control the terminal to execute a file mapped to the virtual display space 221, adjacent to the boundary region 230, where the touch signal is detected.

For example, when a program file or a document file is mapped to the virtual display space 221, the control unit 130 may control the terminal to execute the program file or to open the document file mapped to the virtual display space 221.

For example, when an Internet shortcut file associated with a search site is mapped to the virtual display space 221, the control unit 130 may control the terminal to execute the Internet shortcut file mapped to the virtual display space 221. In this case, a window linked to the related search site may be displayed on the touch display 210. When the user executes a text editor stored in the terminal, inputs a search word into the text editor window, and drags the text editor window with the input search word via a touch input device, and thereby moves the text editor window to the virtual display space 221, the control unit 130 may control the terminal so that a search site window for displaying the search result associated with the search word may be displayed on the touch display 210.

When a movement of the touch signal is in a manner similar to the arrow indicator 240 and detected, and a number of files mapped to the virtual display space 221 is less than or equal to a predetermined number of files, the control unit 130 may control the terminal to execute the mapped files. Conversely, when the number of files mapped to the virtual display space 221 is greater than the predetermined number of files, the control unit 130 may control the terminal to display file information associated with the mapped files on the touch display 210. The predetermined number of files may be set by the user.

When the user moves the touch input device in a manner similar to the arrow indicator 250, the touch signal may be detected in a direction from the virtual display space 223 to the touch display 210 in the boundary space 230.

In this case, the control unit 130 may control the terminal to display a file mapped to the virtual display space 223 on the touch display 210. The file may be displayed in a final detection location of the touch signal. It may be understood as an operation of moving a file stored in the virtual display space 223 to the touch display 210.

The terminal control apparatus 100 will be described with reference again to FIG. 1.

The operations of the terminal control apparatus 100 when a virtual display space is set and at least one file is mapped to the virtual display space have been described above. Hereinafter, an operation of the terminal control apparatus 100 for mapping at least one file to the virtual display space will be described in detail.

According to exemplary embodiments, when a first touch signal input via the touch display is detected in a direction from the touch display to the virtual display space in the boundary space, the mapping unit 120 may map at least one file among a plurality of files to the virtual display space.

Specifically, a portion of or all files may be selected from the at least one file displayed on the touch display. When the user moves a touch input device from the touch display to the virtual display space, the selected portion of or all of the files may be mapped to the virtual display space.

In this case, the control unit 130 may control the terminal to not display the mapping of the selected portion of or all of the files on the touch display. It may be understood that the file is stored in the virtual display space.

According to exemplary embodiments, the terminal control apparatus 100 may further include a file selector (not shown). The file selector may select at least one file based on a second touch signal input via the touch display.

As described above, according to exemplary embodiments, the terminal control apparatus 100 may set at least one virtual display space around the touch display and control the terminal so that the set at least one virtual display space may be regarded as an expanded space of the touch display. Through this, it is possible to expand the display space of the terminal that the user may use.

Figure 3:
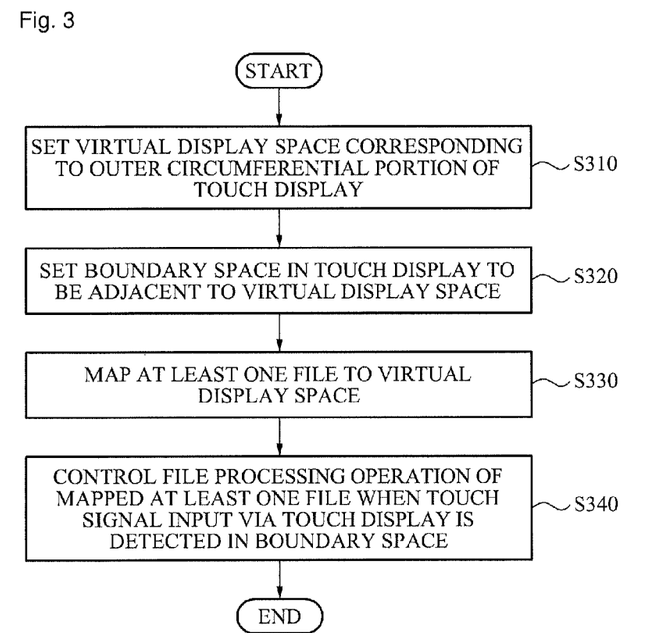
FIG. 3 is a flowchart illustrating a method of controlling a terminal according to exemplary embodiments.
Figure 4:
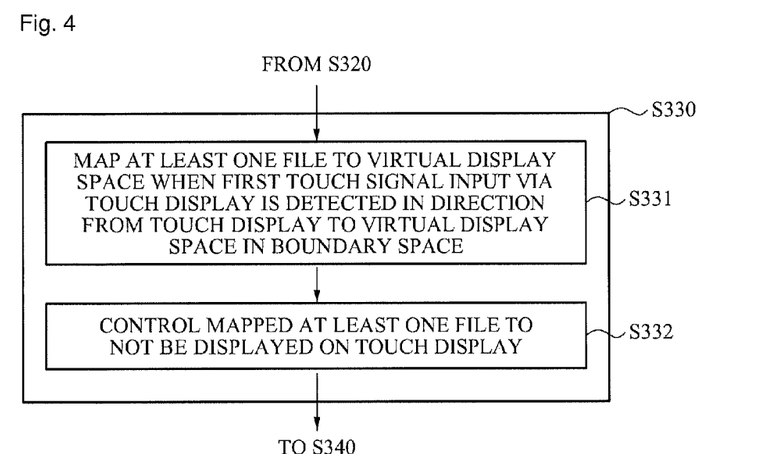
FIG. 4 is a flowchart illustrating an operation of mapping at least one file to a virtual display space shown in FIG. 3.

FIG. 3 is a flowchart illustrating a method of controlling a terminal according to exemplary embodiments, and FIG. 4 is a flowchart illustrating operation S330 of FIG. 3.

Referring to FIGS. 3 and 4, exemplary embodiments of terminal control methods may include operations that may be performed by exemplary embodiments of terminal control apparatus 100 of FIG. 1. Accordingly, descriptions made regarding the terminal control apparatus 100 and omitted here will be applicable to exemplary embodiments of terminal control methods.

In operation S310, a virtual display space corresponding to an outer circumferential portion of the touch display may be set.

For example, the virtual display space may be set on at least one of an upper side surface, a lower side surface, a left side surface, and a right side surface of the touch display.

In operation S320, a boundary space in the touch display may be set to be adjacent to the virtual display space.

In operation S330, at least one file among a plurality of files may be mapped to the virtual display space.

According to exemplary embodiments, in operation S330, at least one file may be mapped to the virtual display space based on at least one of a number of times that each of the files is executed and a point in time when each of the files was most recently executed.

Also, according to exemplary embodiments, in operation S330, at least one file, selected from a user, may be mapped to the virtual display space.

Hereinafter, operation S330 will be described in detail with reference to FIG. 4.

In operation S331, when a first touch signal input via the touch display is detected in a direction from the touch display to the virtual display space in the boundary space, at least one file among the plurality of files may be mapped to the virtual display space.

In operation S332, the control unit 130 may control the at least one mapped file to not be displayed on the touch display.

Exemplary embodiments of terminal control method will be described with reference again to FIG. 3.

In operation S340, a file processing operation of the terminal for the at least one mapped file may be controlled when a touch signal input via the touch display is detected in the boundary space.

According to exemplary embodiments, the file processing operation of the terminal may be controlled when the touch signal is consecutively detected in the boundary space.

Specifically, although the touch signal is detected in the boundary space, the terminal may be controlled to treat the detected touch signal in the same manner as a touch signal that is detected in the touch display region excluding the boundary space in operation S340 when the touch signal is detected only in a particular location of the boundary space.

According to exemplary embodiments, when the touch signal is detected in a direction from the touch display to the virtual display space in the boundary space, the at least one file may be executed to control the file processing operation of the terminal in operation S340.

Also, according to exemplary embodiments, when the touch signal is detected in the direction from the touch display to the virtual display space in the boundary space, file information, associated with the at least one file on the touch display to control the file processing operation of the terminal in operation S340, may be displayed.

Also, according to exemplary embodiments, when the touch signal is detected in a direction from the virtual display space to the touch display in the boundary space, the at least one file to control the file processing operation of the terminal in operation S340 may be displayed on the touch display.

Figure 5:
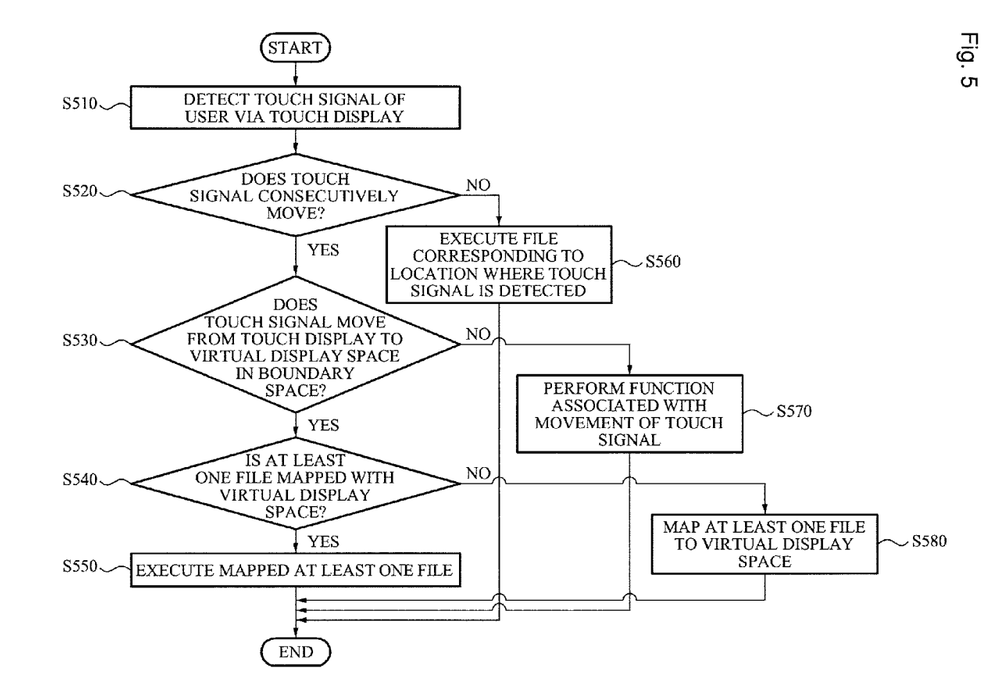
FIG. 5 is a flowchart illustrating a method of controlling a terminal according to other exemplary embodiments.

FIG. 5 is a flowchart illustrating a method of controlling a terminal according to other exemplary embodiments.

In operation S510, a touch signal of a user may be detected via a touch display.

In operation S520, whether the detected touch signal consecutively moves may be determined.

When it is determines the detected touch signal does not consecutively move in operation S520, a file corresponding to a location where the touch signal is detected in operation S560 may be executed.

Conversely, when it is determined the detected touch signal consecutively moves in operation S520, whether the touch signal moves from the touch display to a virtual display space in a boundary space in operation S530 may be determined.

When it is determined the touch signal does not move from the touch display to the virtual display space in the boundary space in operation S530, a function that is pre-set in association with movement of the touch signal, in operation S570 may be performed Conversely, when it is determined the touch signal moves from the touch display to the virtual display space in the boundary space in operation S530, whether any files are mapped to the virtual display space in operation S540 may be determined.

When it is determined at least one file is mapped to the virtual display space in operation S540, the mapping of the at least one file in operation S550 may be executed.

Conversely, when it is determined no files are mapped to the virtual display space in operation S540, at least one file may be mapped to the virtual display space in operation S580.

For example, in operation S580, the at least one file may be mapped to the virtual display space based on at least one of a number of times that each of the files is executed and a point in time when each of the files was most recently executed.

Also, in operation S580, at least one file may be mapped to the virtual display space according to a user selection.

Exemplary embodiments of the terminal control method have been described above. The aforementioned configuration of the terminal control apparatus of FIG. 1 may be applicable to exemplary embodiments and thus further detailed description related thereto will be omitted here.

Terminal control methods according to the above-described exemplary embodiments may be recorded in computer-readable media or a computer readable medium including program instructions to implement various operations embodied by a computer. The media may also include, alone or in combination with the program instructions, data files, data structures, and the like. Examples of computer-readable media include magnetic media such as hard disks, floppy disks, and magnetic tape; optical media such as CD ROM disks and DVDs; magneto-optical media such as optical disks; and hardware devices that are specially configured to store and perform program instructions, such as read-only memory (ROM), random access memory (RAM), flash memory, and the like. The computer-readable media may also be storage media in a distributed network, so that the program instructions are stored and executed in a distributed fashion. The program instructions may be executed by one or more processors or processing devices. The computer-readable media may also be embodied in at least one application specific integrated circuit (ASIC) or Field Programmable Gate Array (FPGA). Examples of program instructions include both machine code, such as produced by a compiler, and files containing higher level code that may be executed by the computer using an interpreter. The described hardware devices may be configured to act as one or more software modules in order to perform the operations of the above-described exemplary embodiments, or vice versa.

Although a few exemplary embodiments have been shown and described, the present disclosure is not limited to the described exemplary embodiments. Instead, it would be appreciated by those skilled in the art that changes may be made to these exemplary embodiments without departing from the principles and spirit of the present disclosure, the scope of which is defined by the claims and their equivalents.

What is claimed is:

1. An apparatus comprising:
   a touch display including an outer circumferential portion at physical edges of the touch display;
   a memory having computer readable instructions stored thereon; and
   at least one processor configured to execute the computer readable instructions to,
      set a boundary space at the outer circumferential portion of the physical edges of the touch display;
      define a virtual display space as one or more virtual areas external to the touch display and the boundary space at the outer circumferential portion of the physical edges of the touch display;
      detect a touch input signal via the touch display;

execute a first file processing operation to map at least one file to the virtual display space based on a first weight applied to a number of times that each of the at least one file has been executed and a second weight applied to a point in time when each of the at least one file was most recently executed when the touch input signal is detected in a direction from the boundary space toward the virtual display space and no files are mapped to the virtual display space;

execute a second file processing operation to execute each of the at least one files mapped to the virtual display space when a number of files mapped to the virtual display space is less than or equal to a specified number of files greater than zero and the touch input signal is detected in a direction from the touch display through the boundary space toward the virtual display space; and execute a third the processing operation to control the touch display to display file information associated with each of the at least one mapped files in the virtual display space when the number of files mapped to the virtual display space is greater than the specified number of files and the touch input signal is detected in a direction from the touch display through the boundary space toward the virtual display space.

2. The apparatus of claim 1, wherein the at least one processor is further configured to display the at least one file on the touch display when the touch input signal is detected in a direction corresponding to a movement from the virtual display space to the touch display.

3. The apparatus of claim 1, wherein the virtual display space is further defined as one or more areas which are external to an upper side surface, a lower side surface, a left side surface, and/or a right side surface of the touch display.

4. The apparatus of claim 1, wherein the at least one processor is further configured to control the at least one mapped file to not be displayed on the touch display after the first file processing operation has been executed.

5. The apparatus of claim 1, wherein the at least one processor is further configured to recognize the touch input signal that results in the execution of the first file processing operation as including a selection touch input that selects the at least one file which is displayed on the touch display.

6. A method of controlling a terminal, the terminal including a touch display having an outer circumferential portion at physical edges of the touch display, the method comprising:

setting a boundary space at the outer circumferential portion of the physical edges of the touch display;

defining a virtual display space as one or more virtual areas external to the touch display and the boundary space at the outer circumferential portion of the physical edges of the touch display;

detecting a touch input signal via the touch display;

executing a first file processing operation to map at least one file to the virtual display space based on a first weight applied to a number of times that each of the at least one file has been executed and a second weight applied to a point in time when each of the at least one file was most recently executed when the touch input signal is detected in a direction from the boundary space toward the virtual display space and no files are mapped to the virtual display space;

executing a second file processing operation to execute each of the at least one files mapped to the virtual display space when a number of files mapped to the virtual display space is less than or equal to a specified number of files greater than zero and the touch input signal is detected in a direction from the touch display through the boundary space toward the virtual display space; and executing a third file processing operation to control the touch display to display file information associated with each of the at least one mapped files in the virtual display space when the number of files mapped to the virtual display space is greater than the specified number of files and the touch input signal is detected in a direction from the touch display through the boundary space toward the virtual display space.

7. The method of claim 6, wherein the at least one file is displayed on the touch display when the touch input signal is detected in a direction corresponding to a movement from the virtual display space to the touch display.

8. The method of claim 6, further comprising:
controlling the at least one mapped file to not be displayed on the touch display after the first file processing operation has been executed.

9. At least one non-transitory computer-readable recording medium storing computer readable instructions that control at least one processor to implement the method of claim 6.

10. The apparatus of claim 1, wherein the at least one processor is configured to control the terminal to perform a function corresponding to the touch input signal regardless of the virtual display space when the touch input signal is detected in the boundary space without movement in the direction from the boundary space toward the virtual display space and when the touch input signal is detected outside the boundary space in the touch display.

11. A system comprising: a mobile terminal including,
a touch display including an outer circumferential portion at physical edges of the touch display;
a memory having computer readable instructions stored thereon; and
at least one processor configured to execute the computer readable instructions to,
set a boundary space at the outer circumferential portion of the physical edges of the touch display;
define a virtual display space as one or more virtual areas external to the touch display and the boundary space at the outer circumferential portion of the physical edges of the touch display;
detect a touch input signal via the touch display;
execute a first file processing operation to map at least one file to the virtual display space based on a first weight applied to a number of times that each of the at least one file has been executed and a second weight applied to a point in time when each of the at least one file was most recently executed when the touch input signal is detected in a direction from the boundary space toward the virtual display space and no files are mapped to the virtual display space;
execute a second file processing operation to execute each of the at least one files mapped to the virtual display space when a number of files mapped to the virtual display space is less than or equal to a specified number of files greater than zero and the touch input signal is detected in a direction from the touch display through the boundary space toward the virtual display space; and
execute a third file processing operation to control the touch display to display file information associated with each of the at least one mapped files in the virtual display space when the number of files mapped to the virtual display space is greater than the specified number of files and the touch input signal is detected in a direction from the touch display through the boundary space toward the virtual display space.

12. A non-transitory computer readable medium having computer readable instructions stored thereon, which when executed by at least one processor, causes the at least one processor to:

set a boundary space at an outer circumferential portion of physical edges of a touch display of a terminal;

define a virtual display space as one or more virtual areas external to the touch display and the boundary space at the outer circumferential portion of the physical edges of the touch display;

detect a touch input signal via the touch display;

execute a first file processing operation to map at least one file to the virtual display space based on a first weight applied to a number of times that each of the at least one file has been executed and a second weight applied to a point in time when each of the at least one file was most recently executed when the touch input signal is detected in a direction from the boundary space toward the virtual display space and no files are mapped to the virtual display space;

execute a second file processing operation to execute each of the at least one files mapped to the virtual display space when a number of files mapped to the virtual display space is less than or equal to a specified number of files greater than zero and the touch input signal is detected in a direction from the touch display through the boundary space toward the virtual display space; and execute a third file processing operation to control the touch display to display file information associated with each of the at least one mapped files in the virtual display space when the number of files mapped to the virtual display space is greater than the specified number of files and the touch input signal is detected in a direction from the touch display through the boundary space toward the virtual display space.

* * * * *